United States Patent
Okamoto et al.

(10) Patent No.: US 7,263,723 B2
(45) Date of Patent: Aug. 28, 2007

(54) APPARATUS AND METHOD FOR OUTPUTTING DIGITAL INFORMATION

(75) Inventors: Hiroo Okamoto, Yokohama (JP);
Hitoaki Owashi, Yokohama (JP);
Atsushi Yoshioka, Ebina (JP);
Yoshimichi Kudo, Fujisawa (JP);
Makoto Aikawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 820 days.

(21) Appl. No.: 10/405,369

(22) Filed: Apr. 3, 2003

(65) Prior Publication Data

US 2003/0219123 A1 Nov. 27, 2003

(30) Foreign Application Priority Data

May 22, 2002 (JP) ............................. 2002-147061
Jan. 10, 2003 (JP) ............................. 2003-003853

(51) Int. Cl.
*H04L 9/00* (2006.01)
*H04N 7/167* (2006.01)

(52) U.S. Cl. .................... 726/31; 380/200; 380/201

(58) Field of Classification Search ........ 380/200–203, 380/217; 713/161, 163, 165, 167, 170, 176, 713/181; 726/26, 31; 705/51, 57, 58–59

See application file for complete search history.

(56) References Cited

U.S. PATENT DOCUMENTS 5,896,454 A    4/1999   Cookson et al.
6,034,832 A    3/2000   Ichimura et al.
6,421,779 B1 * 7/2002   Kuroda et al. ............... 713/169
6,530,021 B1 * 3/2003   Epstein et al. .............. 713/176

FOREIGN PATENT DOCUMENTS

| JP | 11-45507    | 2/1999  |
| JP | 11-339389   | 12/1999 |
| JP | 2001-209587 | 8/2001  |
| JP | 2001-222862 | 8/2001  |

* cited by examiner

*Primary Examiner*—Hosuk Song
(74) *Attorney, Agent, or Firm*—Antonelli, Terry, Stout & Kraus, LLP.

(57) ABSTRACT

The present invention provides a method and an apparatus that, when a copying is limited as "Copy One Generation", prevent the copying from being made into infinite number of storage media without limitation, and thereby protect the profit of a copyright holder concerned.

In the present invention, when outputting digital information whose copying is limited to external appliances connected to plural outputting circuits (315A, 315B, or 72A to 72D), the total number of external appliances to which the digital information is to be outputted is limited within a predetermined constant. In particular, a control circuit (311, or 73) limits the number in which to perform authentications of the external appliances connected to the plural outputting circuits. This makes it possible to limit, within the predetermined constant, the total number of the external appliances to which the digital information is to be outputted.

30 Claims, 7 Drawing Sheets

APPARATUS AND METHOD FOR OUTPUTTING DIGITAL INFORMATION

BACKGROUND OF THE INVENTION

1. Field of the Invention

The present invention relates to an information outputting apparatus and an information outputting method for outputting digital information on a video signal, an audio signal, or the like.

2. Description of the Related Art

Dealing with information on a video signal, an audio signal, or the like as digital information results in a merit that there exists none or a very little of the quality degradation in the information transferring process or the information recording/reproducing process. However, if good-quality copies of the information are created in large numbers and circulated in such a manner that the copyright holder knows nothing thereabout, and if the copying is repeated further, there occurs a problem that no profit will be returned to the copyright holder.

U.S. Pat. No. 5,896,454 has disclosed a method of attaching 2-bit copy-controlling information to information. This method, based on a will of the copyright holder or that of the information creator, selects any one of 3 alternatives to the information, i.e., "Copy Never", "Copy Free", and "Copy One Generation", thereby controlling the operation of a recording apparatus. If "Copy Never" is selected, the recording apparatus performs no recording operation. If "Copy Free" is selected, the apparatus performs the recording operation. Moreover, if "Copy One Generation" is selected, the apparatus rewrites this copy-controlling information to information of "No More Copies", thereinafter performing the recording operation.

SUMMARY OF THE INVENTION

The items disclosed in the above-described prior art are the ones for specifying the operation on the part of the recording apparatus in the case where given information is supplied to the recording apparatus. When, however, dealing with the information specified as "Copy One Generation", there exists the following problem:

The reason for specifying the information not as "Copy Once" but as "Copy One Generation" is that there have existed no effective methods for limiting the number of connected recording apparatuses or the number of the copies. Accordingly, if only the number of the recording apparatuses can be prepared enough, it becomes possible to record the information into even infinite number of storage media. This situation, substantially, becomes nothing different from that of "Copy Free", thereby resulting in an impairment of the copyright holder's profit. Concerning this problem, no mention has been made in the above-described literature.

In view of the above-described problem, an object of the present invention is to provide the following method and apparatus: A method and an apparatus that, when a copying is limited as "Copy One Generation", prevent the copying from being made into infinite number of storage media without limitation, and thereby protect the copyright holder's profit.

The above-described object is accomplished as follows: In an information outputting apparatus for outputting digital information, the apparatus includes plural outputting circuits for outputting the digital information, and a control circuit for controlling the plural outputting circuits, wherein the control circuit limits, within a predetermined constant, the total number of external appliances to which, of external appliances connected to the plural outputting circuits, the digital information is to be outputted.

Also, the above-described object is accomplished as follows: In a digital information outputting apparatus capable of implementing plural outputting circuits, there is provided a control circuit for controlling the plural outputting circuits, the control circuit limiting, within a predetermined constant, the total number of external appliances to which, of external appliances connected to the plural outputting circuits, the digital information is to be outputted.

Also, the above-described object is accomplished as follows: In an information outputting method capable of outputting digital information from plural outputting circuits, the method includes a step of limiting, within a predetermined constant, the total number of external appliances to which, of external appliances connected to the plural outputting circuits, the digital information is to be outputted.

Furthermore, the above-described object is accomplished as follows: In an information outputting apparatus for outputting digital information to external appliances, the apparatus includes plural outputting circuits for outputting the digital information, and a control circuit for controlling the plural outputting circuits, wherein the control circuit limits the number in which to perform authentications with the external appliances, and thereby limits, within a predetermined constant, the total number of external appliances to which, of the external appliances connected to the plural outputting circuits, the digital information is to be outputted.

Also, the above-described object is accomplished as follows: In a digital information outputting apparatus capable of implementing plural outputting circuits, there is provided a control circuit for controlling the plural outputting circuits, the control circuit limiting the number in which to perform authentications of external appliances, and thereby limiting, within a predetermined constant, the total number of external appliances to which, of the external appliances connected to the plural outputting circuits, the digital information is to be outputted.

Also, the above-described object is accomplished as follows: In an information outputting method of outputting digital information from plural outputting circuits to external appliances, the method includes a step of detecting the total number of performing authentication with external appliances connected to the plural outputting circuits, and a step of limiting, within a predetermined constant, the total number of external appliances to which the digital information is to be outputted.

BRIEF DESCRIPTION OF THE DRAWINGS

These and other objects, features and advantages of the present invention will become more readily apparent from the following detailed description when taken in conjunction with the accompanying drawing wherein.

DETAILED DESCRIPTION OF THE INVENTION

Figure 1:
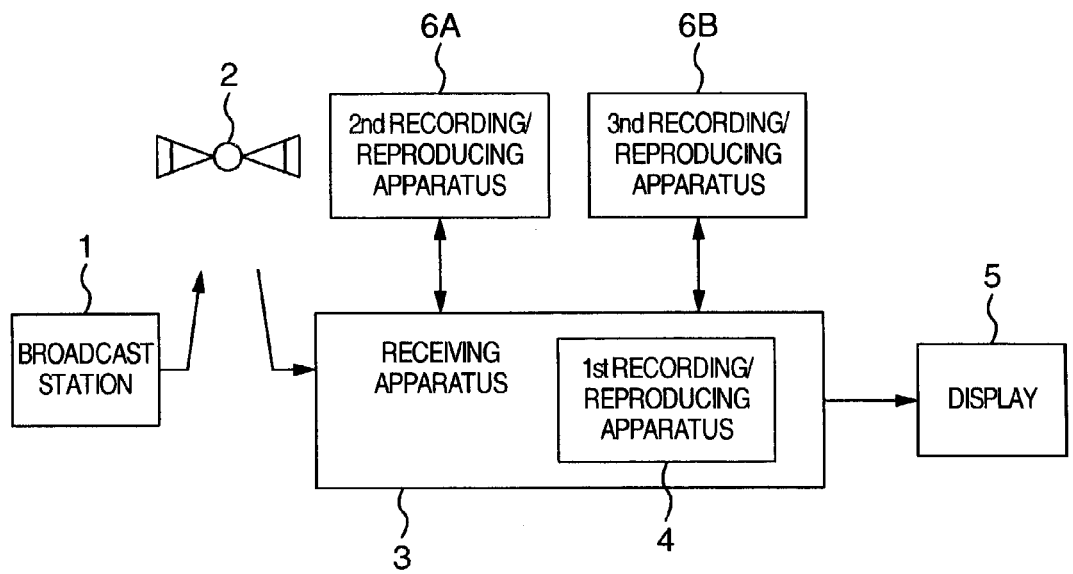
FIG. 1 is a block diagram for illustrating a 1st embodiment of the entire system to which an information outputting apparatus of the present invention is applied.

Hereinafter, referring to the drawings, the detailed explanation will be given below concerning embodiments of the present invention. At first, the explanation will be given regarding the entire system to which the present invention is applied.

FIG. 1 is a block diagram for illustrating a 1st embodiment of the entire system in which an information outputting apparatus of the present invention is used. A receiving apparatus 3 receives information that is broadcast from an information providing station 1, such as a broadcast station, via a relay station 2. Next, the information is recorded/reproduced by a 1st recording/reproducing apparatus 4, a 2nd recording/reproducing apparatus 6A, and a 3rd recording/reproducing apparatus 6B, then being watched and listened to using a display 5. In this case, the receiving apparatus 3 is equivalent to what is called the information outputting apparatus in the present invention, and the recording/reproducing apparatuses 6A and 6B are equivalent to what are called the external appliances therein.

The information providing station 1 such as a broadcast station transmits the information, as a signal radio wave modulated by the information, via the relay station 2, e.g., a broadcasting satellite. In addition to this, it is also allowable to use the transmission by a cable, the transmission by a telephone line, the transmission by a ground-wave broadcast, or the like. The receiving apparatus 3, i.e., the receiving side, after receiving and demodulating the signal, records the signal into the 1st recording/reproducing apparatus 4, the 2nd recording/reproducing apparatus 6A, and the 3rd recording/reproducing apparatus 6B, depending on the requirement. Also, the display 5 allows the received information content to be directly watched and listened to, or allows the information reproduced by the 1st to the 3rd recording/reproducing apparatuses 4, 6A, and 6B to be watched and listened to.

It is assumed here that the 1st recording/reproducing apparatus 4 is based on a digital recording scheme where the apparatus 4 is built in the receiving apparatus 3. As its storage medium, a hard disk is available, for example. Since the information storage time-period is comparatively short, the recording/reproducing apparatus built in the receiving apparatus may be a non-removable medium. The 2nd recording/reproducing apparatus 6A and the 3rd recording/reproducing apparatus 6B here are externally attached to the receiving apparatus 3. In addition to the hard disk, their storage media may also be removable media such as a magnetic tape and an optical disk.

If the copy-controlling information attached to information that has been broadcast is "Copy Free", the information may be recorded into any one of the 1st to the 3rd recording/reproducing apparatuses 4, 6A, and 6B. If, on the other hand, the copy-controlling information is "Copy Never" or "Copy One Generation", recording the information is limited as will be explained later.

Although the embodiment in FIG. 1 includes the 3 units of recording/reproducing apparatuses, the present invention is not limited thereto. Namely, the present invention is applicable regardless of the number of the apparatuses, or regardless of whether the apparatuses are built in or are externally attached. Also, the present invention is not applied to only the system for recording/reproducing the received information. Namely, needless to say the case of reproducing a package software into which information has been recorded in advance, the present invention is applicable to the following cases as well: The case where information on air at present is simply received and is outputted to the display 5, or the case where information is reproduced from a hard disk or the like of a PC (:Personal Computer) and is outputted to the outside of the apparatus via a graphic board or the like.

When there is provided a removable storage medium into which information has been recorded in advance, e.g., the package software, the reproducing operation or thereafter is performed in, e.g., the 2nd recording/reproducing apparatus 6A onto which the package software is mounted. Although this case turns out to be a one where the information providing station 1 and the relay station 2 are removed, the present invention is applicable all the same.

In many cases, the transmission/reception of the information between the apparatuses is performed using a digital signal. In some cases, however, the connection between, e.g., the receiving apparatus 3 and the display 5, is established using an analogue signal. Some connection is established using a luminance and 2 chrominance difference signals, and the other connection is established using an RGB signal like a PC.

Figure 2:
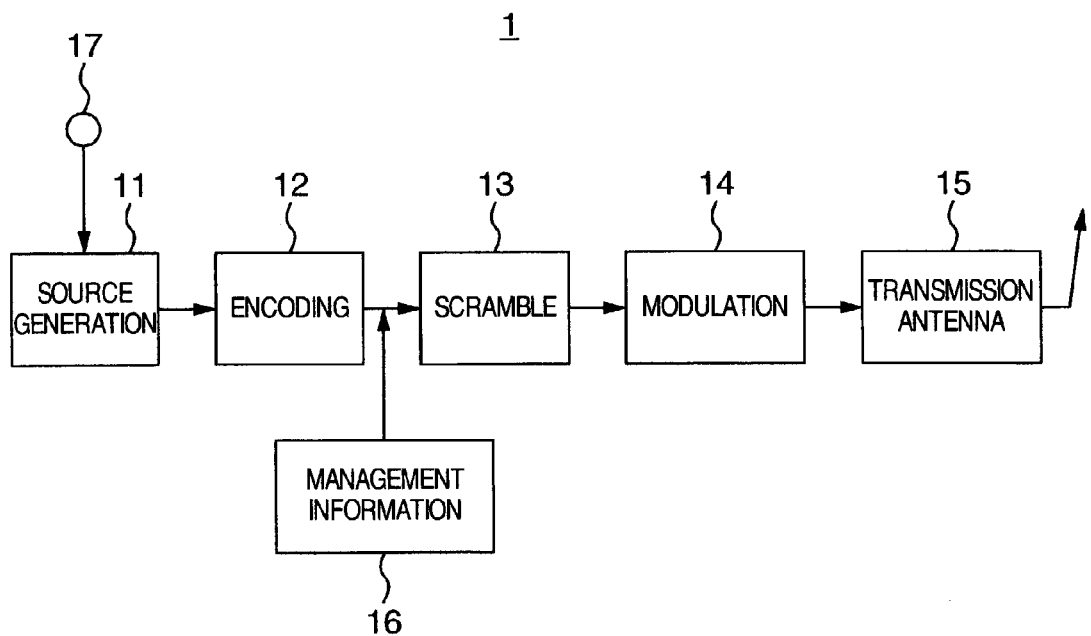
FIG. 2 is a block diagram for illustrating a configuration example of the information providing station 1 in FIG. 1.

FIG. 2 is a block diagram for illustrating a configuration example of the information providing station 1 in FIG. 1. A source generating unit 11 including a camera, a recording/reproducing apparatus, and the like generates the information on a video signal, an audio signal, or the like. Next, an encoding circuit 12, using the MPEG method or the like, performs the data-amount compression over the information so that the information will be able to be transmitted in a narrower occupation band. If a protection such as the copy limitation is necessary, a scrambling circuit 13 encrypts the information. Moreover, the information is modulated by a modulation circuit 14 into the signal that is suitable for being transmitted, then being launched as the radio wave from a transmission antenna 15 toward the relay station 2, e.g., the broadcasting satellite. At this time, a management-information attaching circuit 16 attaches the above-described copy-controlling information or the like to the information. Also, some information, e.g., video-on-demand request information from the receiving side, is inputted into an input terminal 17 via the telephone line or the like. The station 1 determines information that is to be transmitted in answer to this request.

Incidentally, there are many cases where, using methods such as the time-division multiplexing and the spectrumspread multiplexing, plural pieces of information are multiplexed onto the radio-wave signal to be transmitted. In this case, there exist plural source generating units and the encoding circuits. In addition, a multiplexing circuit for multiplexing the plural pieces of information is located between the encoding circuit 12 and the scrambling circuit 13.

Figure 3:
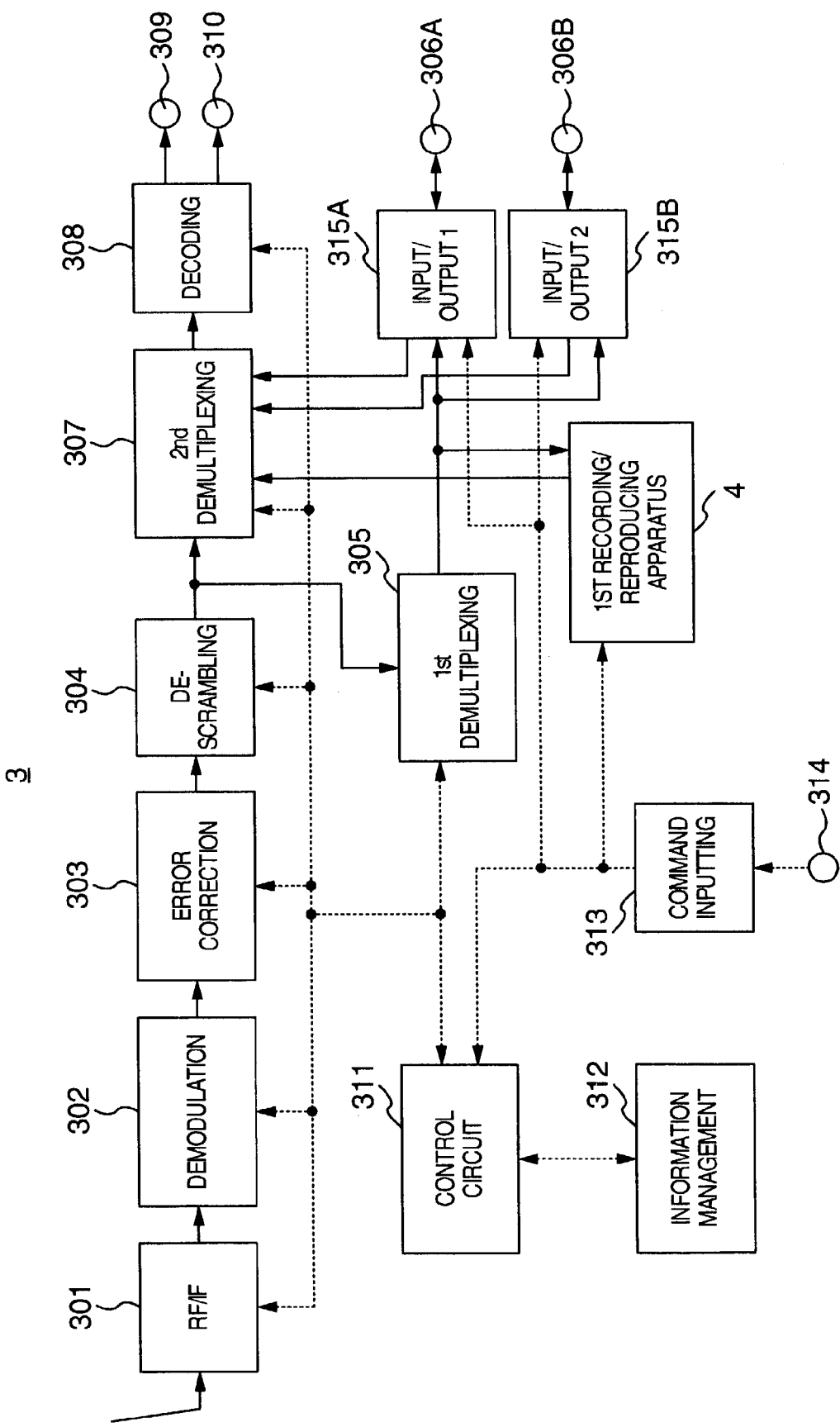
FIG. 3 is a block diagram for illustrating a configuration example of the receiving apparatus 3 (i.e., the information outputting apparatus) in FIG. 1.

FIG. 3 is a block diagram for illustrating a configuration example of the receiving apparatus 3 in the system illustrated in FIG. 1. The solid lines in the drawing indicate the flow of the information such as the received video signal/audio signal, which becomes the main information. Also, the dashed lines therein indicate the flow of control signals among the respective configuration components. The case indicated here is the one where the 1st recording/reproducing apparatus 4 is built in the receiving apparatus 3.

At first, the explanation will be given below regarding the configuration of the present embodiment along the flow of the main information such as the video signal/audio signal indicated by the solid lines. The radio wave from the relay station 2, e.g., the broadcasting satellite, is inputted into an RF/IF converting circuit 301. Here, the radio wave in the RF band is frequency-converted into the one in the IF (: Intermediate Frequency) band, and also becomes a signal in a constant band that does not depend on the receiving channels. Next, a demodulating circuit 302 demodulates the modulation operation performed over the signal for the transmission. Moreover, an error correcting circuit 303 detects and corrects further an error in the sign that has occurred halfway in the transmission. Furthermore, a descrambling circuit 304 performs the decryption of the transmission-encrypted signal. After that, the signal is sent to 1st and 2nd demultiplexing circuits 305 and 307. The demultiplexing circuits 305 and 307 isolate only desired information from plural pieces of information multiplexed on a single channel. The reasons for providing the 2 demultiplexing circuits are not only a necessity for making it possible to record what is called "a different-channel program", but also a necessity for causing the 1st demultiplexing circuit 305 to eliminate information not to be recorded and to add information to be recorded. The information that need not be recorded, e.g., a weather forecast and a program broadcasting schedule, is eliminated here.

The output of the 1st demultiplexing circuit 305 is supplied to input/output circuits 315A and 315B as well as to the 1st recording/reproducing apparatus 4. The 2nd recording/reproducing apparatus 6A and the 3rd recording/reproducing apparatus 6B are connected to the input/output circuits 315A and 315B respectively via input/output terminals 306A and 306B. The input/output circuits 315A and 315B are, e.g., bidirectional input/output interfaces, which, in terms of e.g., digital data, transmit/receive the information or the like recorded/reproduced with the 2nd and the 3rd recording/reproducing apparatuses 6A and 6B. In general, the connection based on the IEEE 1394 standard is used a lot. Also, the USB (: Universal Serial Bus) connection used a lot in PCs is usable, or a wireless connection is usable using a wireless LAN (: Local Area Network) or the like. Also, the number of the input/output circuits 315A and 315B is not limited to 2, but the input/output circuits may be provided in even larger numbers. Otherwise, plural input/output interfaces having different specifications are also usable.

The 1st to the 3rd recording/reproducing apparatuses 4, 6A, and 6B perform the recording operation in accordance with the copy-controlling information attached to information to be recorded. If the copy-controlling information indicates "Copy Never" or "No More Copies", the apparatuses perform no recording. If the copy-controlling information indicates "Copy One Generation", the apparatuses rewrite this information to "No More Copies", thereinafter performing the recording. If the copy-controlling information indicates "Copy Free", the apparatuses perform the recording immediately. Incidentally, as special cases, the recording operation is also allowable in the following cases: The case where, despite the case of "Copy Never", the temporary recording is performed after setting a limit to the time-period during which the information will be reproduced and utilized, or the case where, despite the case of "No More Copies", the information is moved on condition that an original information-source be made irreproducible.

The following information has been inputted into the above-described 2nd demultiplexing circuit 307: The information sent from the descrambling circuit 304, the information reproduced at the 1st recording/reproducing apparatus 4, or the information reproduced at the 2nd and the 3rd recording/reproducing apparatuses 6A and 6B via the input/output circuits 315A and 315B. The demultiplexing circuits select and isolate the desired information from these plural pieces of information. A decoding circuit 308 next thereto performs an expansion processing to the data-amount compression performed over the information before the transmission by the MPEG method or the like, then sending the information to the external apparatuses via output terminals 309 and 310. The output terminals 309 and 310 may be either of a digital output terminal and an analogue output terminal. Also, it is possible to use the terminals 309 and 310 separately, i.e., the former as the digital output terminal and the latter as the analogue output terminal. The output terminals may also be set up as 1 in number.

Next, the explanation will be given below regarding the configuration in FIG. 3 along the control signals indicated by the dashed lines therein. A control circuit 311 performs the transmission/reception of the control signals with the above-described respective configuration components, thereby performing a control over the entire receiving apparatus 3 so that the entire receiving apparatus 3 will perform a desired operation. Here, the configuration components range from the RF/IF converting circuit 301 all the way to the input/output circuits 315A and 315B through the 1st and the 2nd demultiplexing circuits 305 and 307 and the decoding circuit 308. An information managing circuit 312, depending on a request, supplies the control circuit 311 with management data for performing the control. The circuit 312 has managed, e.g., information on reception contracts. When a user designates a channel that the user wishes to watch and listen to, this designation is inputted from an input terminal 314, then being sent to the control circuit 311 via a command inputting circuit 313. Then, the control circuit 311 requests the information managing circuit 312 to send the reception-contracts information. If the control circuit 311 judges that the user has made a contract with the channel that the user designated, the control circuit sends the control signals to the above-described respective configuration components, thereby performing a control operation of, e.g., instructing an operation for receiving the channel.

Also, when the 1st recording/reproducing apparatus 4 is built in the receiving apparatus 3, the apparatus 4 performs the recording/reproducing operation in response to the user's instruction inputted from the input terminal 314. For this purpose, the output of the command inputting circuit 313 has been supplied. The control signal at this time may also be supplied from the control circuit 311.

Next, the explanation will be given below regarding the copy-controlling information that has been attached to the received information, or that is attached thereto at the time of the output thereof from the input/output circuits. As the copy-controlling information, e.g., 3-bit information as given in Table 1 is used.

TABLE 1

| Copy-controlling information | | | |
|---|---|---|---|
| CCI | EPN | Copy control | Ttransmission |
| 00 | 1 | Copy Free | Not encrypted |
| 00 | 0 | Copy Free | Encrypted |
| 10 | 1 | Copy One Generation | Encrypted |
| 01 | 1 | No More Copies | Encrypted |
| 11 | 1 | Copy Never | Encrypted |

The CCI, which is 2-bit information, indicates the following: "Copy Free" in the case of "00", "Copy One Generation" in the case of "10", "No More Copies" in the case of "01", which means that information only one generation of which can be copied has been copied, and, "Copy Never" in the case of "11". Additionally, "No More Copies" is not used at the time of the transmission of a broadcast or the like. When the CCI is the 2 bits other than "00", the information is transmitted in a manner of being encrypted at the time of the output. This protects the information if its unauthorized copy is made. The EPN, which is 1-bit information, indicates, when the EPN is "0", that the information is transmitted in the manner of being encrypted although no limit is set to the copying. This protects the information from its illegitimate use other than the copying made by an authorized recording appliance.

Next, the explanation will be given below concerning a limit set to the number of the copies, which is a characteristic of the present invention. In order to limit the number of the copies, it is satisfying enough to limit the number of the appliances connected to all of the input/output terminals. Namely, let's consider the total number N of the number of the appliances connected to the input/output circuit 315A and that of the appliances connected to the input/output circuit 315B. Then, the total number N is managed using the control circuit 311, thereby limiting the total number N such that the number N will become smaller than a predetermined limit number Nm (e.g., Nm=62). Further, the number of connections indicates the number of the appliances logically connected, that is to say, the number of appliances which are possible to receive information.

Figure 4:
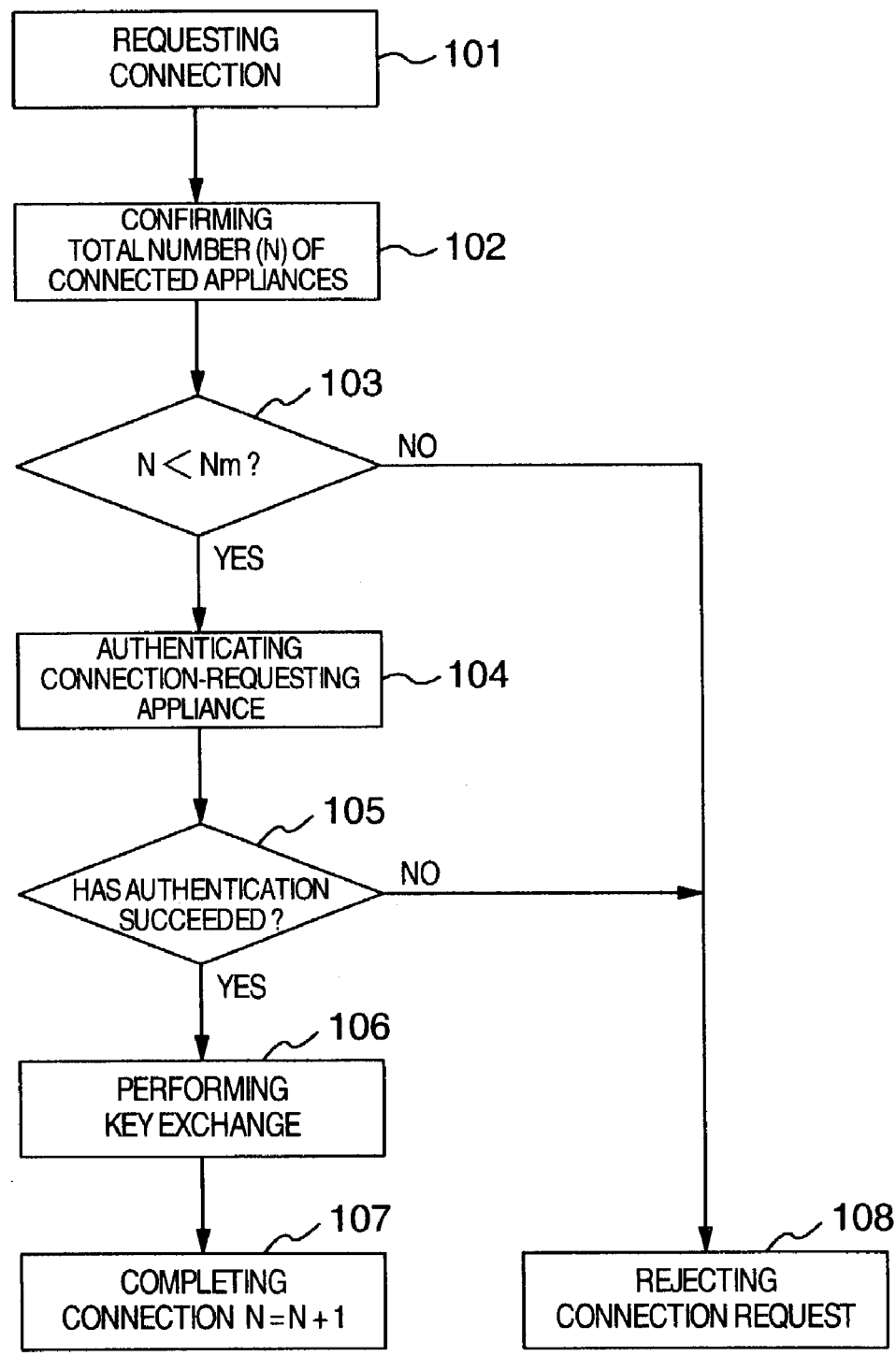
FIG. 4 is a diagram for illustrating a flowchart for the connection of appliances in the 1st embodiment.

FIG. 4 is a diagram for illustrating a flowchart for the connection of the appliances in the input/output circuit 315A or 315B. If a connection request (S 101) is made from an appliance that wishes to establish a connection, the input/output circuit 315A or 315B, which has received the connection request, inquiries of the control circuit 311 about the number N of the appliances connected to the input/output circuits 315A and 315B at present (S 102). Then, if N is found to be less than the limit number Nm (S 103), the input/output circuit performs an authentication of the requesting appliance (S 104). In this authentication, e.g., the input/output circuit sends predetermined information to the requesting appliance, then, based on a response thereto, judging whether or not the requesting appliance is an authorized appliance (S 105). If the authentication has been found to be successful, the input/output circuit judges that the requesting appliance is the authorized one, thus passing an encryption key to the requesting appliance (S 106) and thereby completing the connection. At the same time, the input/output circuit informs the control circuit 311 that the connection has been established, thereby updating the connection number N managed by the control circuit 311 (S 107). Meanwhile, if N is not found to be less than Nm (S 103), or if the authentication has been not found to be successful (S 105), the input/output circuit does not pass the encryption key to the requesting appliance, thereby rejecting the connection (S 108). On account of this, the requesting appliance has no decipher key now. Consequently, if the requesting appliance, which has been not permitted to establish the connection, should receive the encrypted information, the appliance finds it impossible to decrypt the encrypted information.

Incidentally, the connection request (S 101) may also be an authentication request. In this case, it turns out that the control circuit manages the number N of the authenticated appliances. Also, instead of passing the encryption key (S 106), the input/output circuit may pass information for generating a common key.

Usually, the authentication processing is performed in either or both of the input/output circuits. Accordingly, in the case of only one input/output circuit, it is satisfying enough that the only one input/output circuit performs the management of the connection number as well as the authentication. Meanwhile, in the case where there exist plural input/output circuits, it is impossible to manage the total connection number although it is possible to manage a connection number in each input/output circuit. In such a case as well, the management of the total connection number in the control circuit 311 allows the management of the number of the appliances connected to all of the input/output circuits.

In this way, in the case as well where there are provided the plural input/output circuits, limiting the number of the appliances connected to the input/output circuits makes it possible to limit the number of the copies. Incidentally, the plural input/output circuits may be the interfaces having different specifications, or may be output-specific interfaces, of course. Also, the control circuit 311 may perform the operations, including the authentication processing.

It is satisfying enough to perform the management of the connection number N only when outputting information that becomes a protection target indicated by the copy-controlling information. The management of the connection number may also be performed in all the cases where the information necessitates the protection. Meanwhile, if the limit to the number of the copies is selected as an object, the management may also be performed only when outputting, e.g., the information specified as "Copy One Generation". Also, the management may also be performed regarding all of the appliances connected to all of the input/output circuits. Meanwhile, if the management is performed regarding only an input/output circuit that outputs the information that is the protection target, or regarding only a recording-capable appliance, it becomes possible to perform the management more accurately. Additionally, when outputting plural types of information, it is advisable to perform the management independently on each information basis.

Figure 5:
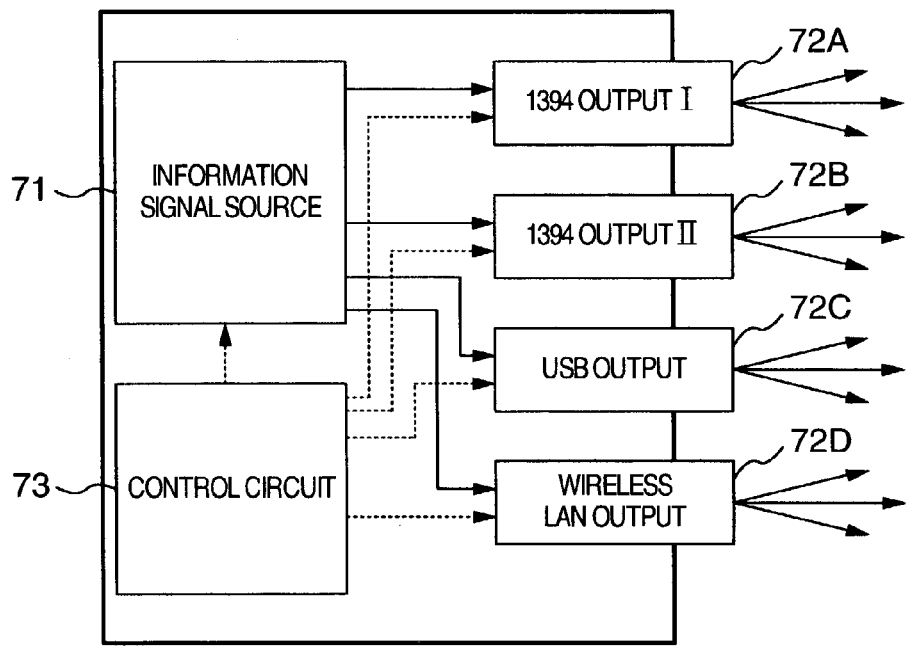
FIG. 5 is a block diagram for illustrating a 2nd embodiment of the information outputting apparatus of the present invention.

FIG. 5 is a block diagram for illustrating a 2nd embodiment of the information outputting apparatus of the present invention. An information signal source 71, which includes an information receiving apparatus, an information recording/reproducing apparatus, or the like, outputs the information to the external appliances by input/output circuits 72A to 72D. Here, it is assumed that, as an example, the input/output circuits 72A and 72B are the IEEE 1394 standards, the input/output circuit 72C is the USB standard, and the input/output circuit 72D is the interface based on a wireless network. A control circuit 73 is basically the same as the control circuit 311 in FIG. 3. In this way, in the case as well where there are provided the plural input/output circuits having the different specifications, as is the case with the embodiment in FIG. 3, the total number of the appliances connected to the input/output circuits is limited using the control circuit 73. This makes it possible to limit the number of the copies.

Figure 6:
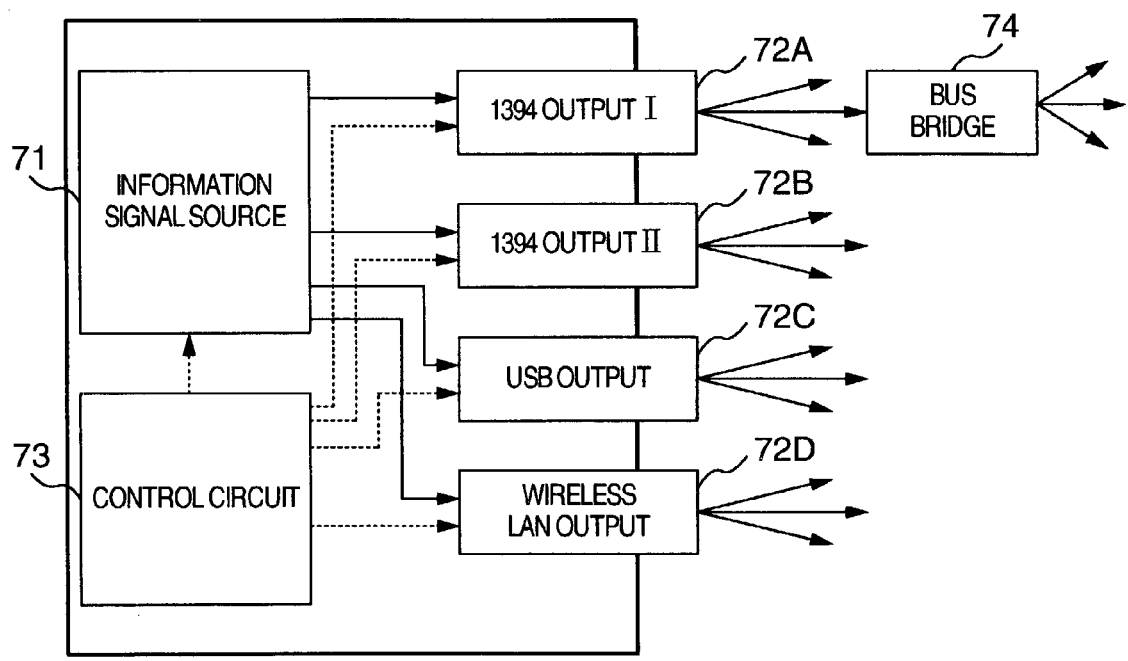
FIG. 6 is a block diagram for illustrating a 3rd embodiment of the information outputting apparatus of the present invention.

Incidentally, the input/output circuits 72A and 72B are the identical interfaces to each other. If, however, outputs are performed from the circuits with different identification IDs, the outputs become independent of each other, and the processing such as a connection is performed in each input/output circuit. Also, if, although the input/output circuits are the identical interfaces, the circuits perform the transmissions in accordance with different transmission schemes (i.e., transmission protocols), when the controls are performed independently on each transmission-scheme basis, it is advisable to use the control circuit 73 so as to limit the total number of the appliances connected to the input/output circuits, FIG. 6 is a block diagram for illustrating a 3rd embodiment of the information outputting apparatus of the present invention. This embodiment is about the case where a bus bridge 74 for relaying between different buses exists therebetween. In this case, it is also required to take into consideration the number of appliances connected to the input/output circuits via the bus bridge 74. Additionally, the bus bridge 74 may be a one for relaying between the buses having the same specification, or may be a one for relaying between the buses having different specifications.

Figure 7:
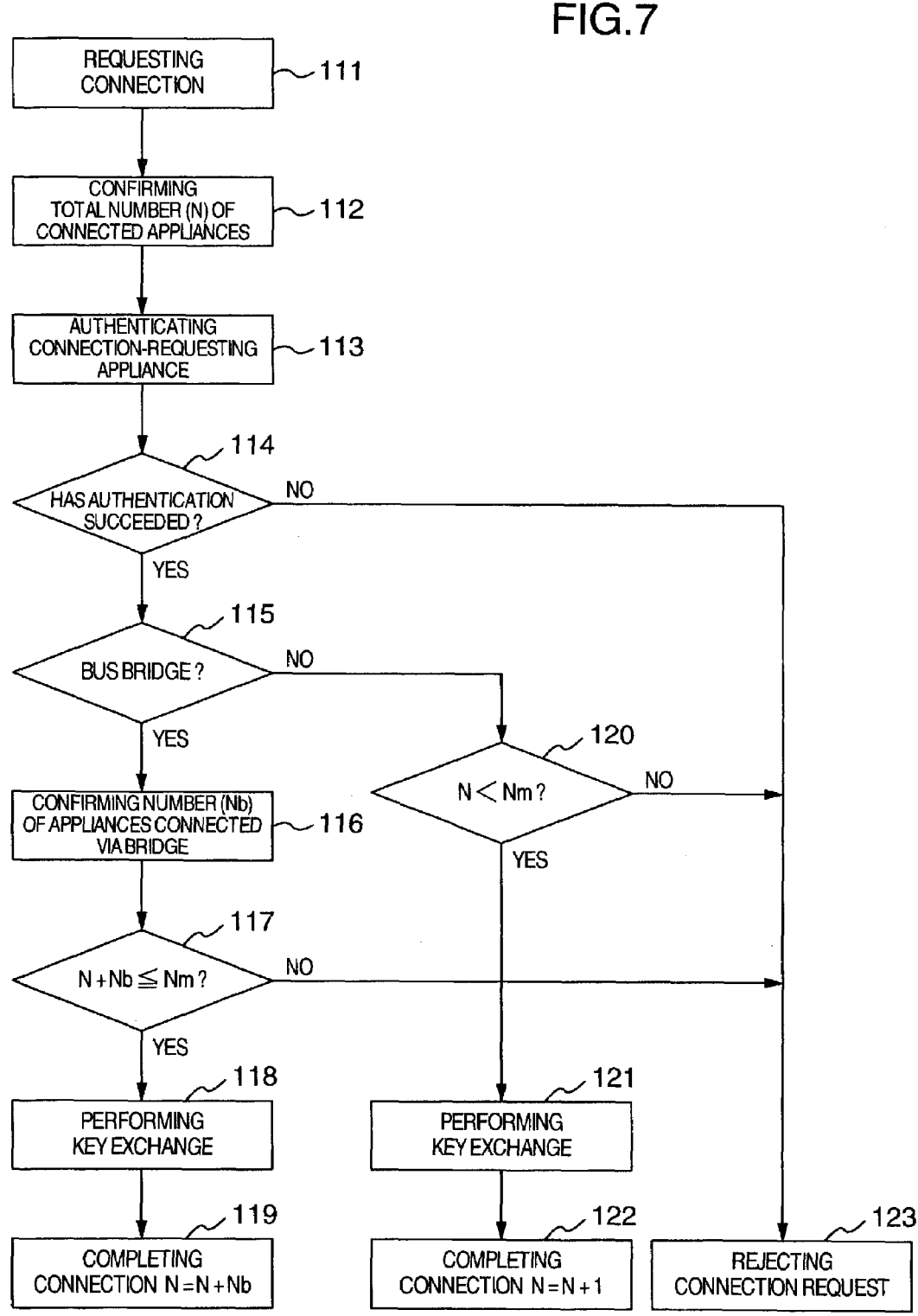
FIG. 7 is a diagram for illustrating a flowchart for the connection of appliances in the 3rd embodiment.

FIG. 7 is a diagram for illustrating a flowchart for the connection of the appliances in the case where, like the embodiment in FIG. 6, the bus bridge 74 exists between the buses. If a connection request (S 111) is made from an appliance that wishes to establish a connection, the input/output circuit 72A, 72B, 72C, or 72D, which has received the connection request, inquiries of the control circuit 73 about the number N of the appliances connected to the input/output circuits 72A to 72D at present (S 112). Next, the input/output circuit performs an authentication of the connection requesting appliance (S 113). Incidentally, at this time, as is the case with the step (i.e., S 103) in FIG. 4, the input/output circuit may make the confirmation as to whether or not N is less than the limit number Nm. If the authentication has been found to be successful, the input/output circuit judges that the requesting appliance is an authorized appliance (S 114), then making a confirmation as to whether or not the requesting appliance is a bus bridge (S 115). If the appliance is not the bus bridge (S 120), and also if N is found to be less than the limit number Nm, the input/output circuit passes an encryption key to the requesting appliance (S 121), thereby completing the connection. At the same time, the input/output circuit informs the control circuit 73 that the connection has been established, thereby updating the connection number N managed by the control circuit 73 (S 122). Meanwhile, if the requesting appliance is the bus bridge, the input/output circuit acquires, from the bus bridge, the number Nb of the appliances connected to the input/output circuits via the bus bridge (S 116). Moreover, if N+Nb is found to be smaller than Nm (S 117), the input/output circuit passes the encryption key to the requesting appliance (S 118), thereby completing the connection. At the same time, the input/output circuit informs the control circuit 73 that the connection has been established, thereby updating, to N+Nb, the connection number N managed by the control circuit 73. If N+Nb is found to exceed Nm (S 117), the input/output circuit rejects the connection (S 123). Incidentally, a connection may also be established under a condition that the connections via the bus bridge are limited within the range that does not exceed Nm.

Figure 8:
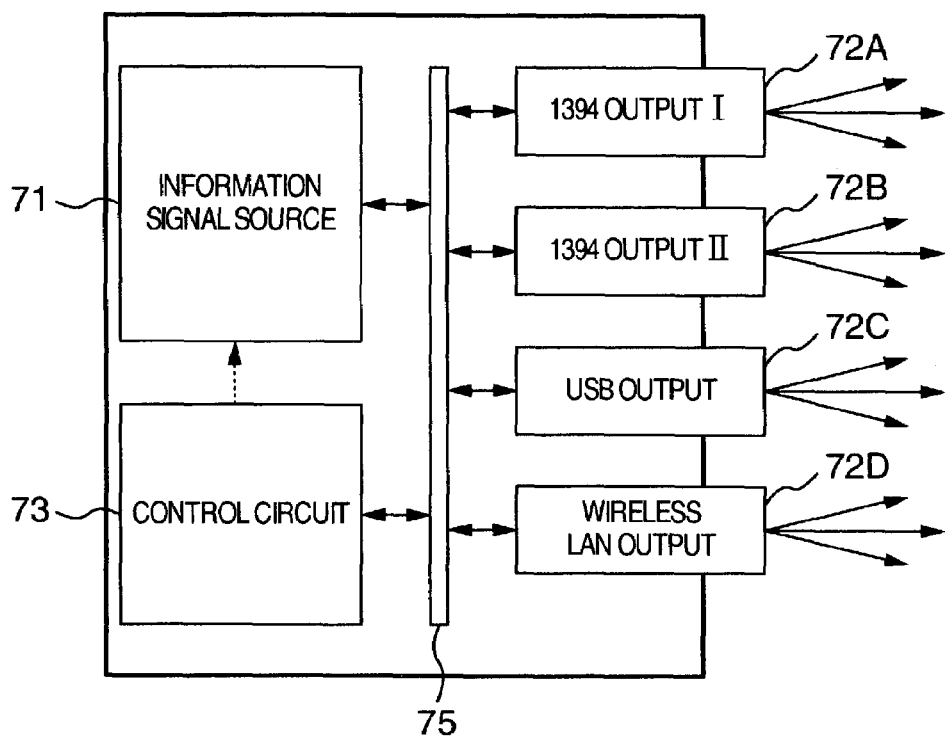
FIG. 8 is a block diagram for illustrating a 4th embodiment of the information outputting apparatus of the present invention.

FIG. 8 is a block diagram for illustrating a 4th embodiment of the information outputting apparatus of the present invention. The embodiment here is about the case where an information signal source 71, e.g. a PC appliance, a control circuit 73, and input/output circuits 72A to 72D are connected to each other via an internal bus 75, and are made removable. Here, the configuration of the internal bus 75 is as follows: All of the circuits may be connected to a single internal bus. Otherwise, e.g., using plural internal buses, the information signal source 71 may be connected to the control circuit 73 via a 1st bus, and the input/output circuits 72A to 72D may be connected to the control circuit 73 via a 2nd bus.

In this embodiment, at first, it is required to make a confirmation as to whether or not the mounted input/output circuits 72A to 72D are authorized input/output circuits, i.e., whether or not the input/output circuits meet the limit set to the connection number. Accordingly, the control circuit 73 performs authentications of the mounted input/output circuits 72A to 72D, then encrypting information from the information signal source 71 and sending the encrypted information to an input/output circuit whose authentication has been found to be successful. This makes it possible to prevent the information from being outputted via the input/output circuits other than the authorized input/output circuit. Also, instead of performing the authentications, it is advisable to cause the authorized input/output circuit and the information signal source 71 to share a common key. The limitation on the connection number may be set in accordance with basically the same steps as those in FIG. 4 or FIG. 7.

Figure 9:
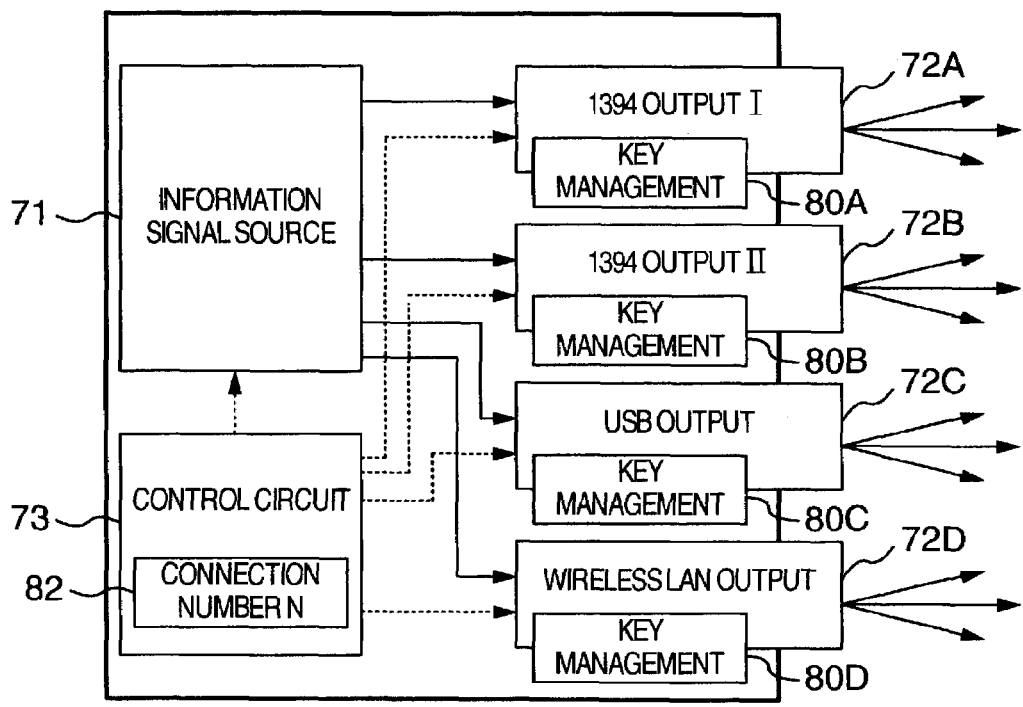
FIG. 9 is a block diagram for illustrating a 5th embodiment of the information outputting apparatus of the present invention.

FIG. 9 is a block diagram for illustrating a 5th embodiment of the information outputting apparatus of the present invention. Reference numerals 80A to 80D denote key managing units for managing encryption keys, and a numeral 82 denotes a connection-number managing unit for managing the connection number N. If a connection request or an authentication request is made from an appliance that wishes to establish a connection, an input/output circuit 72A, 72B, 72C, or 72D inquiries of a control circuit 73 about the number N of appliances that are connected to the input/output circuits or are authenticated at present. Then, if N is found to be less than the limit number Nm, the input/output circuit performs an authentication of the appliance. If the authentication has been found to be successful, the input/output circuit judges that the requesting appliance is an authorized one. Then, accordingly, the input/output circuit passes the requesting appliance the encryption key or information for generating a common key, which have been managed by the key managing unit 80A, 80B, 80C, or 80D, thereby completing the connection. At the same time, the input/output circuit informs the control circuit 73 that the connection has been established, thereby updating the connection number N managed by the control circuit 73. In this way, the key managing unit 80A, 80B, 80C, or 80D manages each encryption key that each input/output circuit uses, and the connection-number managing unit 82 in the control circuit 73 manages the connection number N. This allows the management of the connection number to be performed in the case as well where the respective input/output circuits use different encryption keys, and further in the case as well where the respective input/output circuits use different encryption schemes or authentication schemes.

Figure 10:
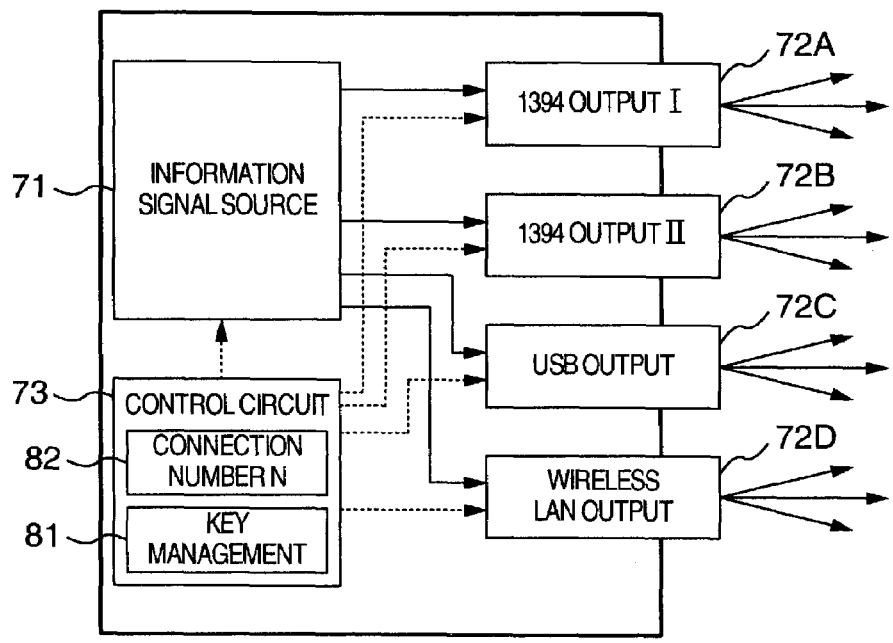
FIG. 10 is a block diagram for illustrating a 6th embodiment of the information outputting apparatus of the present invention.

FIG. 10 is a block diagram for illustrating a 6th embodiment of the information outputting apparatus of the present invention. A reference numeral 81 denotes a key managing unit for managing an encryption key, and a numeral 82 denotes a connection-number managing unit for managing the connection number N. If a connection request or an authentication request is made from an appliance that wishes to establish a connection, an input/output circuit 72A, 72B, 72C, or 72D requests a control circuit 73 to perform an authentication of the appliance. The control circuit 73 confirms the number N of appliances that are connected to the input/output circuits or are authenticated at present. Then, if N is found to be less than the limit number Nm, the control circuit performs the authentication of the appliance. If the authentication has been found to be successful, the control circuit judges that the requesting appliance is an authorized one. Then, accordingly, the control circuit passes the requesting appliance the encryption key or information for generating a common key, which have been managed by the key managing unit 81, thereby completing the connection. At the same time, the control circuit updates the connection number N. In this way, the control circuit 73 manages the encryption key and the connection number N. This allows the authentication and the key management to be performed by the 1 circuit in the case as well where there are provided the plural input/output circuits.

Figure 11:
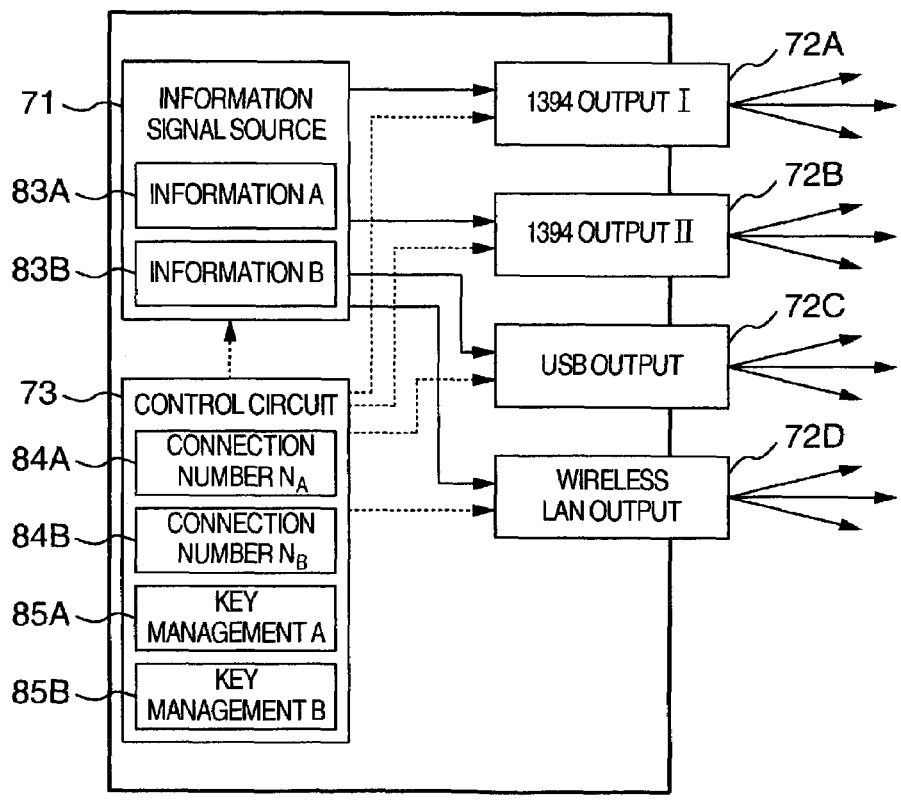
FIG. 11 is a block diagram for illustrating a 7th embodiment of the information outputting apparatus of the present invention.

FIG. 11 is a block diagram for illustrating a 7th embodiment of the information outputting apparatus of the present invention. Reference numerals 83A and 83B denote information in an information signal source 71, and 84A and 84B denote connection-number managing units for managing connection numbers $N_A$ and $N_B$ for the respective information, and 85A and 85B denote key managing units for managing encryption keys for the respective information. The information 83A and 83B are, e.g., received information from a different channel, and information reproduced from the received information and a recording/reproducing apparatus. In the case of outputting plural types of information from the information signal source 71, such as the information A and the information B, managing the connection numbers on each information basis makes it possible to limit the number of the copies on each information basis.

Of course, in the case as well of outputting the plural types of information, the management may be performed using only the total connection number. Although, in this case, the connection number turns out to be limited more than necessary, there occurs no need of managing to which appliance which information has been outputted. This allows a simplification to be implemented in the processing for the management. This, further, when the copying is limited as "Copy One Generation", makes it possible to prevent the copying from being made into infinite number of storage media without limitation.

As having been explained so far, according to the present invention, it becomes possible to provide the apparatus and method for protecting the profit of a copyright holder. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and range of equivalency of the claims are therefore intended to be embraced therein.

What is claimed is:

1. An information outputting apparatus for outputting digital information to external appliances, comprising:

plural outputting circuits for outputting said digital information to said external appliances connected thereto, and a control circuit for controlling said plural outputting circuits, wherein each of said plural outputting circuits includes an authentication function for performing authentication of one of said external appliances connected thereto and outputs said digital information to an authorized one of said external appliances; and wherein said control circuit limits the total number of external appliances to which said digital information is outputted to a predetermined number by limiting the total number of external appliances authenticated by said plural outputting circuits.

2. An information outputting apparatus as claimed in claim 1, wherein said plural outputting circuits include outputting circuits whose outputting specifications differ from each other.

3. An information outputting apparatus as claimed in claim 1, wherein, when said digital information to be outputted is information that necessitates a protection, said control circuit limits said total number of said external appliances to which said digital information is outputted to said predetermined number.

4. An information outputting apparatus as claimed in claim 3, wherein, when said digital information to be outputted is information whose copying is limited, said control circuit limits said total number of said external appliances to which said digital information is outputted to said predetermined number.

5. An information outputting apparatus for implementing plural outputting circuits to output digital information from said plural outputting circuits to external appliances, said information outputting apparatus comprising:

a control circuit for controlling said plural outputting circuits, wherein each of said plural outputting circuits includes an authentication function for performing authentication of one of said external appliances connected thereto and outputs said digital information to an authorized one of said external appliances; and wherein said control circuit limits the total number of external appliances to which said digital information is outputted to a predetermined number by limiting the total number of external appliances authenticated by said plural outputting circuits, said external appliances being connected to said plural outputting circuits.

6. An information outputting apparatus as claimed in claim 5, wherein said plural outputting circuits include outputting circuits whose outputting specifications differ from each other.

7. An information outputting apparatus as claimed in claim 5, wherein, when said digital information to be outputted is information that necessitates a protection, said control circuit limits said total number of said external appliances to which said digital information is outputted to said predetermined number.

8. An information outputting apparatus as claimed in claim 7, wherein, when said digital information to be outputted is information whose copying is limited, said control circuit limits said total number of said external appliances to which said digital information is outputted to said predetermined number.

9. An information outputting apparatus as claimed in claim 5, wherein, only when said outputting circuits implemented therein are outputting circuits capable of limiting said total number of said external appliances to said predetermined number, said control circuit enables said outputting circuit to output said digital information.

10. An information outputting method of outputting digital information from plural outputting circuits to external appliances, comprising the steps of:
  outputting said digital information to one of said external appliances when said outputting circuits judge that said one of the external appliances is an authorized appliance connected to one of said plural outputting circuits,
  detecting the total number of external appliances authorized to receive said digital information by performing an authentication in each of said outputting circuits, said external appliances being connected to said plural outputting circuits, and
  limiting said total number of said external appliances to which said digital information is outputted to a predetermined number.

11. An information outputting method as claimed in claim 10, wherein said plural outputting circuits include outputting circuits whose outputting specifications differ from each other.

12. An information outputting method as claimed in claim 10, wherein, when said digital information to be outputted is information that necessitates a protection, said total number of said external appliances to which said digital information is outputted is limited to said predetermined number.

13. An information outputting method as claimed in claim 10, wherein, when said digital information to be outputted is information whose copying is limited, said total number of said external appliances to which said digital information is outputted is limited to said predetermined number.

14. An information outputting apparatus for outputting digital information to external appliances, comprising:
  plural outputting circuits for outputting said digital information to said external appliances connected thereto, and
  a control circuit for controlling said plural outputting circuits,
  wherein each of said plural outputting circuits includes an authentication function for performing authentication of one said external appliances connected thereto and outputs said digital information to an authorized one of said external appliances; and
  wherein said control circuit limits the number of times by which perform authentications with said external appliances, and thereby limits the total number of external appliances to which said digital information is outputted to a predetermined number by limiting the total number of external appliances authenticated by said plural outputting circuits.

15. An information outputting apparatus as claimed in claim 14, wherein said plural outputting circuits include outputting circuits whose outputting specifications differ from each other.

16. An information outputting apparatus as claimed in claim 14, wherein, when said digital information to be outputted is information that necessitates a protection, said control circuit limits said total number of said external appliances to which said digital information is outputted to said predetermined number.

17. An information outputting apparatus as claimed in claim 16, wherein, when said digital information to be outputted is information whose copying is limited, said control circuit limits said total number of said external appliances to which said digital information is outputted to said predetermined number.

18. An information outputting apparatus for implementing plural outputting circuits to output digital information from said plural outputting circuits to external appliances, said information outputting apparatus comprising:
  a control circuit for controlling said plural outputting circuits.
  wherein each of said plural outputting circuits includes an authentication function for performing authentication of one of said external appliances connected thereto and outputs said digital information to an authorized one of said external appliances; and
  wherein said control circuit limits the number of times by which perform authentications with said external appliances, and thereby limits the total number of external appliances to which said digital information is outputted to a predetermined number by limiting the total number of external appliances authenticated by said plural outputting circuits, said external appliances being connected to said plural outputting circuits.

19. An information outputting apparatus as claimed in claim 18, wherein said plural outputting circuits include outputting circuits whose outputting specifications differ from each other.

20. An information outputting apparatus as claimed in claim 18, wherein, when said digital information to be outputted is information that necessitates a protection, said control circuit limits said total number of said external appliances to which said digital information is outputted to said predetermined number.

21. An information outputting apparatus as claimed in claim 20, wherein, when said digital information to be outputted is information whose copying is limited, said control circuit limits said total number of said external appliances to which said digital information is outputted to said predetermined number.

22. An information outputting apparatus as claimed in claim 18, wherein, only when said outputting circuits implemented therein are outputting circuits capable of limiting said total number of said external appliances to said predetermined number, said control circuit allows said output of said digital information.

23. An information outputting method of outputting digital information from plural outputting circuits to external appliances, comprising the steps of:
  outputting said digital information to one of said external appliances when said outputting circuits judge that said one of the external appliances is an authorized appliance connected to one of said plural outputting circuits,
  detecting the total number of external appliances authorized to receive said digital information by performing an authentication in each of said outputting circuits, and
  limiting the total number of external appliances to which said digital information is outputted to a predetermined number.

24. An information outputting method as claimed in claim 23, wherein said plural outputting circuits include outputting circuits whose outputting specifications differ from each other.

25. An information outputting method as claimed in claim 23, wherein, when said digital information to be outputted is information that necessitates a protection, said total number of said external appliances to which said digital information is outputted is limited to said predetermined number.

26. An information outputting method as claimed in claim 23, wherein, when said digital information to be outputted is information whose copying is limited, said total number of said external appliances to which said digital information is outputted is limited to said predetermined number.

27. An information outputting apparatus as claimed in claim 14, wherein said digital information is outputted from said plural outputting circuits in a form of being encrypted by one and the same encryption key.

28. An information outputting apparatus as claimed in claim 14, wherein said digital information is outputted from said plural outputting circuits in a form of being encrypted by different encryption keys.

29. An information outputting apparatus as claimed in claim 18, wherein said digital information is outputted from said plural outputting circuits in a form of being encrypted by one and the same encryption key.

30. An information outputting apparatus as claimed in claim 18, wherein said digital information is outputted from said plural outputting circuits in a form of being encrypted by different encryption keys.

* * * * *